(12) United States Patent
Rousseau

(10) Patent No.: US 10,970,993 B2
(45) Date of Patent: Apr. 6, 2021

(54) METHOD FOR MANAGING THE ASSISTANCE TO A PERSON IN RESPONSE TO THE EMISSION OF AN ALERT

(71) Applicant: HAREAU, Paris (FR)

(72) Inventor: Ferdinand Rousseau, Paris (FR)

(73) Assignee: HAREAU, Paris (FR)

( * ) Notice: Subject to any disclaimer, the term of this patent is extended or adjusted under 35 U.S.C. 154(b) by 0 days.

(21) Appl. No.: 16/981,078

(22) PCT Filed: Mar. 15, 2019

(86) PCT No.: PCT/EP2019/056597
§ 371 (c)(1),
(2) Date: Sep. 15, 2020

(87) PCT Pub. No.: WO2019/179898
PCT Pub. Date: Sep. 26, 2019

(65) Prior Publication Data
US 2021/0027610 A1 Jan. 28, 2021

(30) Foreign Application Priority Data

Mar. 20, 2018 (FR) ...................................... 1870311

(51) Int. Cl.
*G08B 25/01* (2006.01)
*G08B 25/00* (2006.01)
(Continued)

(52) U.S. Cl.
CPC ....... *G08B 25/016* (2013.01); *G08B 21/0269* (2013.01); *G08B 21/043* (2013.01);
(Continued)

(58) Field of Classification Search
None
See application file for complete search history.

(56) References Cited

U.S. PATENT DOCUMENTS

| 6,754,621 B1 * | 6/2004 | Cunningham | ......... | G06Q 40/04 |
| | | | | 704/219 |
| 6,993,588 B2 * | 1/2006 | Davis | ...................... | G06F 9/465 |
| | | | | 340/5.8 |

(Continued)

FOREIGN PATENT DOCUMENTS

CN 107071160 A 8/2017

OTHER PUBLICATIONS

International Preliminary Report on Patentability and the Written Opinion of the International Searching Authority as issued in International Patent Application No. PCT/EP2019/056597, dated Mar. 25, 2020.

(Continued)

*Primary Examiner* — Fekadeselassie Girma
(74) *Attorney, Agent, or Firm* — Pillsbury Winthrop Shaw Pittman LLP

(57) ABSTRACT

A method for managing the assistance to a person in response to the emission of an alert includes emitting an alert from a piece of mobile equipment of a first user to a plurality of users; establishing a first two-way communication between the first equipment and a given terminal of the first set of an assisting user; automatic generating of a plurality of first notifications to a subset of terminals of the first set, each one of the notifications including at least one piece of data that identifies the assisting user; automatic generating of a plurality of second notifications to the second subset, each second notification including a status relative to the processing of the alert by the assisting user.

13 Claims, 2 Drawing Sheets

(51) Int. Cl.
  *H04M 1/725* (2006.01)
  *H04M 11/04* (2006.01)
  *G08B 21/02* (2006.01)
  *H04W 76/50* (2018.01)
  *G08B 25/10* (2006.01)
  *H04W 4/029* (2018.01)
  *H04W 4/90* (2018.01)
  *H04W 40/06* (2009.01)
  *G08B 21/04* (2006.01)
  *H04W 4/06* (2009.01)

(52) U.S. Cl.
  CPC ........... *G08B 25/005* (2013.01); *G08B 25/10* (2013.01); *H04M 1/72541* (2013.01); *H04M 11/04* (2013.01); *H04W 4/029* (2018.02); *H04W 4/06* (2013.01); *H04W 4/90* (2018.02); *H04W 76/50* (2018.02)

(56) References Cited

U.S. PATENT DOCUMENTS

| | | | |
|---|---|---|---|
| 7,130,385 B1* | 10/2006 | Moon | H04M 11/04 379/45 |
| 7,574,194 B2 | 8/2009 | Yang et al. | |
| 2003/0195723 A1* | 10/2003 | Bensky | G01S 13/84 702/189 |
| 2007/0013547 A1* | 1/2007 | Boaz | G01D 4/002 340/870.02 |
| 2008/0198004 A1* | 8/2008 | Luss | G08B 25/009 340/539.26 |
| 2008/0214142 A1 | 9/2008 | Morin et al. | |
| 2010/0271469 A1* | 10/2010 | She | G06K 9/00765 348/77 |
| 2012/0295573 A1 | 11/2012 | Park et al. | |
| 2013/0154799 A1* | 6/2013 | Moran | G06K 7/0008 340/9.11 |
| 2014/0028469 A1* | 1/2014 | Ali | G08C 19/00 340/870.03 |
| 2014/0361906 A1* | 12/2014 | Hughes | H04Q 9/00 340/870.01 |
| 2016/0104368 A1 | 4/2016 | Sullivan et al. | |
| 2016/0224951 A1* | 8/2016 | Hoffberg | G06Q 20/10 |
| 2016/0360474 A1* | 12/2016 | Arzelier | H04W 12/0013 |
| 2018/0020421 A1* | 1/2018 | Kumar | H04W 4/30 |
| 2019/0141501 A1* | 5/2019 | Webb | H04W 4/70 |
| 2019/0209022 A1* | 7/2019 | Sobol | G08B 21/0288 |
| 2020/0352008 A1* | 11/2020 | Chan | H04W 4/90 |

OTHER PUBLICATIONS

International Search Report as issued in International Patent Application No. PCT/EP2019/056597, dated May 16, 2019.

* cited by examiner

METHOD FOR MANAGING THE ASSISTANCE TO A PERSON IN RESPONSE TO THE EMISSION OF AN ALERT

CROSS-REFERENCE TO RELATED APPLICATIONS

This application is the U.S. National Stage of PCT/EP2019/056597, filed Mar. 15, 2019, which in turn claims priority to French patent application number 18/70311 filed Mar. 20, 2018. The content of these applications are incorporated herein by reference in their entireties.

FIELD

The field of the invention relates to that of devices that allow a person to obtain assistance from a community of users or from a dedicated assistance service. More particularly, the field of the invention relates to the fields of methods for managing the assistance to a person who has solicited help by the emission of an SOS message from a piece of mobile equipment.

PRIOR ART

There are methods that allow a group of individuals to provide assistance to a person who has solicited help via a piece of mobile electronic equipment. Such systems exist for example in order to allow an elderly person to contact their close network so as to warn them of a danger.

This is the case for example of methods that make it possible to generate an alert with public or private assistance services that make it possible to warn of the imminence of a danger or an accident. Such a method is described in the document of patent US2008214142. Such a system can be used from a portable telephone for example.

With the emergence of social networks and tools that make it possible to define services with communities, certain assistance services make it possible to generate emergency messages with communities. This is the case of the systems described in the documents U.S. Pat. No. 7,574,194 or even with a set of users in the vicinity of the emergency call such as is described in the document CN107071160.

One of the major challenges is to be able to improve the rapidity of the action with a person in danger and to make it possible to coordinate the assistance provided.

However, the current methods do not always make it possible to coordinate well the assistance following the emission of the call. It can arise, when an individual from the solicited community responds to an emergency call, that the person contacted is not able to resolve the problem. It is then necessary to relay the assistance request by adding information or by contacting individuals in particular.

The solution described in document U.S. Pat. No. 7,574,194 proposes to increase the description of the situation encountered. But this situation cannot always be properly entered in particular because this description requires lucidity and time that the person may not be in a position to provide in light of the danger or accident situation.

There is therefore a need to define a solution that makes it possible to contact a network of persons who are able to assist a person who has emitted an emergency call while still providing enriched information on the following of the assistance of a person.

SUMMARY OF THE INVENTION

The method of the invention makes it possible to resolve the aforementioned problems.

According to a first aspect the invention relates to a method for managing the assistance to a person in response to the emission of an alert including:

Emitting an alert SOS from a first mobile equipment of a first user by means of a wireless interface to a first set of terminals of a plurality of users each having a call identifier, the call identifiers being recorded in a memory of the first mobile electronic equipment or of a remote equipment;

Establishing a first two-way communication between the first equipment and a given terminal of the first set of a given user, called "assisting user";

Automatic generating of a plurality of first notifications to a subset of terminals of the first set, each one of the first notifications comprising at least one piece of data identifying the assisting user;

Automatic generating of a plurality of second notifications to terminals of the second subset, each second notification comprising a status relative to the processing of the alert by the assisting user.

An advantage is to make it possible to coordinate the assistance provided to an individual who has emitted an SOS, in particular by automatically keeping the other users of the community who received the SOS informed of the status of the response provided by the user who responded to the SOS call.

According to an embodiment, the emission of the SOS alert is generated following at least one of the events of the following list:

A pressing at least for a predefined duration on a control interface of the first equipment;

A detecting of an acceleration exceeding a predefined threshold, said acceleration being acquired from an accelerometer arranged within said first equipment;

A detecting of an acceleration sequence having a minimum of similarity with an acceleration profile over a predefined period, said acceleration sequence being acquired from an accelerometer arranged within the first equipment.

An advantage is to generate SOS messages automatically when a case corresponding to a danger or an accident is detected by the user equipment thanks to at least one sensor.

According to an embodiment, the emission of the SOS alert is generated from a low-speed communication protocol of the GSM, GPRS, LTE-M or NB-IOT type. An advantage is to propose a method suitable for equipment that is inexpensive, simple and which includes a minimum of components.

According to an embodiment, the first two-way communication is established following the validation of an acceptance command on a given terminal of the assisting user of the plurality of users. An advantage is to be able to establish a communication as a simple acceptance gesture such as a command on a user interface.

According to an embodiment, the first two-way communication is automatically established following a call request coming from a given terminal of the assisting user. An advantage is to automatically generate from the standpoint of the individual in distress a response proposition from a user of the community.

According to an embodiment, the first two-way communication is automatically established following a call request coming from the first equipment following the reception of a notification comprising information that identifies the assisting user who emitted an acceptance command. An advantage is to allow the individual to select assistance that is adapted to the situation for example by accepting or refusing in turn the response of a user.

According to an embodiment, the first notification is automatically emitted following the establishing of the first two-way communication from:
- the first equipment, or;
- the given terminal that validated the acceptance command or;
- a data server comprising information on the identification of the users of the second set.

According to an embodiment, the SOS alert comprises information that identifies the first user and a geographical position of the first equipment.

According to an embodiment, the first notification comprises a geographical position of the assisting user. An advantage is to keep the other users following the call informed of the response provided. In particular, the identity of the assisting user is communicated, which allows each person to not generate parasite calls at this time to the individual who emitted the SOS.

According to an embodiment, the second notification comprises a call duration and a resolution indicator. An advantage is to deliver a maximum amount of information to the community in order to get an idea of the situation and of the help provided. Each element communicated allows each person to form an opinion of the situation without generating unnecessary calls to obtain information.

According to an embodiment, when the first two-way communication is interrupted, a request to establish another communication is automatically undertaken by the first equipment or by the given terminal of the assisting user.

According to an embodiment, when no acceptance command has been established within a predefined period of time:
- a new SOS message is emitted within the first set;
- a message is emitted to a predefined call center.

An advantage is to provide a fallback solution to the first individual automatically when no acceptance command is spontaneously validated following the emission of the first SOS.

According to an embodiment, the assisting user can, from a predefined command, transmit an instruction that results in the establishing of a second two-way communication between the first user and a second given user. According to an embodiment, the assisting user can, from a predefined command, undertake the establishing of a second two-way communication between the first user and a second given user. An advantage is to determine as quickly as possible the best solution to response to the SOS.

According to another aspect, the invention relates to a computer program product including a calculator and a memory for the implementation of the steps of the method relating to the first equipment. According to another aspect, the invention relates to a computer program product including a calculator and a memory for the implementation of the steps of the method of the invention relating to a terminal establishing the first communication. An advantage is to make it possible to download a piece of software remotely on a piece of mobile equipment in order to carry out the method of the invention.

According to another aspect, the invention relates to a piece of mobile electronic equipment comprising a control interface comprising an actuator through which the generating of a command results in the emission of an SOS message intended for a first set of users using a wireless communication interface, said equipment comprising means for:
- establishing a first two-way communication with a given terminal of the first set of a given user, called "assisting user";
- automatically generating a plurality of first notifications to a subset of terminals of the first set, each one of the first notifications comprising at least one piece of data identifying the assisting user;
- automatically generating a plurality of second notifications to terminals of the second subset, each second notification comprising a status relative to the processing of the alert by the assisting user.

According to an embodiment, the first equipment comprises means for decoding the call identifier or the identity of the assisting user so as to automatically generate a notification to the other users, said notification comprising information concerning the identity of the assisting user or of their call identifier.

According to an embodiment, the equipment comprises means for implementing the steps of the method of the invention.

BRIEF DESCRIPTION OF THE FIGURES

Other characteristics and advantages of the invention shall appear when reading the following detailed description, in reference to the accompanying figures, which show.

DESCRIPTION

Device

Figure 1:
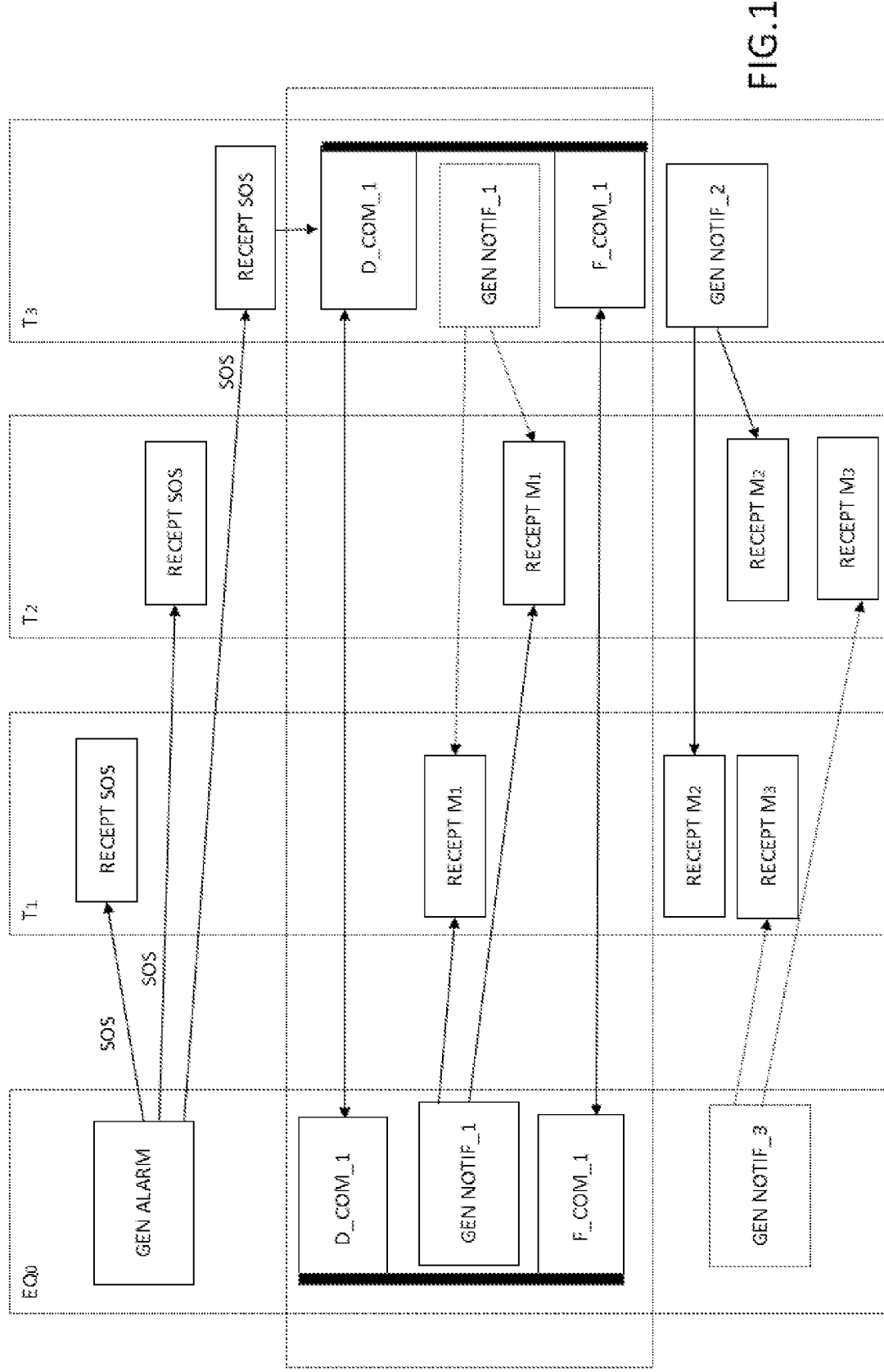
FIG. 1: an example of a message exchange sequence according to the method of the invention.

The invention relates to a device and to a method. The device is designated as a piece of mobile electronic equipment. It comprises at least a calculator, a memory, a control interface, a communication interface and a battery or a source of energy. According to an embodiment, the communication interface is a 2G, GSM, GPRS, 3G, LTE-M, NB-IOT, Sigfox, LoRa, 5G interface. An interest is to define an inexpensive device intended to emit an emergency signal. A low-speed wireless connection is sufficient for carrying out the minimum communication functions. However, the equipment of the invention can include a broadband communication interface of the 4G or Wifi type or any other wireless communication protocol.

According to an embodiment, the equipment of the invention is simplified, it includes a minimum of components and functionalities. Indeed, the equipment of the invention allows, for example, an elderly person to emit, in case of an emergency, an SOS signal to a community of people including friends, neighbors or family or any other known persons.

According to an embodiment, the control interface of the equipment of the invention is a button of which a press for a predefined period of time makes it possible to emit an SOS message. The equipment $EQ_0$ includes an audio interface including a microphone and a headset jack making it possible to deliver and to transmit an audio message using communication that supports voice. The equipment includes all the radio elements that make it possible to modulate, demodulate, decode and encode baseband frames of the radio signal.

According to an embodiment, the equipment $EQ_0$ of the invention includes at least one accelerometer. This can be, for example, a so-called "three-axis" accelerometer that makes it possible to deliver three acceleration measurements. The emission of the SOS message can then be triggered automatically when at least one measured acceleration component exceeds a certain threshold. According to another example, the SOS message can be emitted automatically when the measured acceleration is substantially close to a predefined acceleration profile. By way of example, an acceleration profile including a first phase of acceleration corresponding to the falling of a person followed by a second phase of absence of acceleration can correspond to the falling of a person who has passed out. The calculator and is the memory of the equipment $EQ_0$ make it possible to exploit the data of the acceleration sensor. An advantage is to make it possible to detect a suspicious standstill of a person or a fall of a person.

A location system can also be used to deliver a position, such as a GPS position. This data can make it possible to detect an abnormal path of an individual.

According to another example, the equipment includes a gyroscope making it possible to improve the detecting of curves linked to an abnormal activity that can correspond to an imminent danger or an accident.

When a piece of position or orientation or acceleration data is considered as being outside the normal scope, an SOS message can automatically be emitted within the community. The calculator is then able to perform comparison or correlation operations or any other calculation making it possible to determine a singularity in the parameters relating to the environment off the equipment $EQ_0$.

According to an embodiment, the equipment $EQ_0$ includes a temperature sensor. Detecting a temperature higher than a threshold makes it possible to automatically undertake the emitting of an SOS message to the community of subscribers. This option makes it possible to obtain assistance quickly in case of a fire for example.

According to an embodiment, if the equipment $EQ_0$ exits a predefined geographical zone, the emitting of an SOS message can be sent automatically to the user community of the service. This even can be triggered by a geofencing function. Implementing this function makes it possible to remotely monitor the position and the movement of an object and/or of a person and to take measures, such as the automatic emitting of a message, if the position or the movement moves away from certain values set beforehand.

According to an embodiment, the equipment $EQ_0$ is a simplified piece of equipment including a single button. The control interface defined by the button is then preferably mechanical. A press for a given lapse of time, makes it possible to generate an SOS message to the community. The duration of the pressing on the button can be, for example, configured between 2 s and 4 s, for example for 3 s.

According to an embodiment, the equipment $EQ_0$ includes a battery, for example of the Lithium-Ion type. Charging the battery can be performed by placing the equipment $EQ_0$ on a base powered by the mains. According to an embodiment, it comprises a socket of the USB type or any other electrical connector that makes it possible to charge a battery.

According to an embodiment, the equipment $EQ_0$ is sealed, i.e. waterproof. It allows for an immersion in water to a depth of up to several meters. According to an embodiment, the equipment $EQ_0$ is provided with a humidity sensor or any type of sensor making it possible to deduce that the equipment $EQ_0$ is in a liquid medium such as water. When the sensor detects a value greater than a predefined threshold indicating that the equipment $EQ_0$ is in an aqueous medium, that can for example correspond to a fall into a pool, an automatic generating of an SOS message is emitted to the community of users. The message emitted can include information coming from the value measured by the sensor such as "flooded equipment" in order to provide users with information on the context of the emergency transmission.

According to an embodiment, the SOS message can be emitted only when a double condition is fulfilled. For example the double condition can correspond to a detection of water followed by a standstill of the equipment $EQ_0$. Any other combination of events can be configured in the equipment so as to configure the conditions for emitting an SOS message.

Configuration of the Equipment

The method of the invention allows an individual $U_0$ to warn a plurality of users $\{U_i\}_{i \in [1;N]}$ of an imminent danger or of an accident using the first equipment. The list of the users is then defined beforehand. They are viewed as subscribers to the service of the first individual $U_0$. According to an embodiment, the method of the invention includes a step of configuring. The step of configuring has beforehand made it possible to define who is able to receive SOS message, i.e. emergency messages, coming from the first individual $U_0$.

For this purpose, according to a first embodiment, the configuration can be carried out directly on the equipment of the first individual $U_0$. This then entails defining a particular address book by mentioning the call numbers of subscribers to the emergency service.

According to another embodiment, the configuration can be done by accessing a remote data server $SERV_0$. An interest is to allow for a configuration remotely. In this case, the configuration can be performed from any connected computer station or mobile equipment with sufficient rights. The address book is then accessible online and can be modified when a user has read rights, and optionally modify rights to modify the list of users. Rights management can be performed for example using a dedicated authentication server (not shown) or the same server $SERV_0$. An advantage is that a person of the community of an individual $U_0$ can configure their address book. This case can occur when a child or grandchild of an individual configures the account for the latter.

According to an embodiment, the method of the invention takes account rights management of the different users. By way of example, a user $U_1$ can have the rights to edit new users and configure the call priorities, in particular the criteria to be taken into account of which for example:

- the priority emitting of an emergency message with a sub-community comprised of the closest persons to the first individual;
- the emitting of an emergency message to the entire community in a second step, for example after a certain time has elapsed, following the emitting of a first priority emergency message;
- taking account of at least one geographical position of the users in generating SOS messages;
- prioritizing the emitting of the emergency messages over time according to the geographical criterion,
- etc.

Generating of an SOS

FIG. 1 shows an embodiment of a data exchange sequence according to the method of the invention. A first individual $U_0$ including an electronic equipment $EQ_0$ of the invention emits an SOS alarm. This step is noted as GEN_ALARM in FIG. 1. It allows for the emitting of an SOS message intended for a plurality of users of a service that can be accessed via a terminal.

The pieces of equipment, noted here as $T_1$, $T_2$, $T_3$, are each associated with a user noted respectively as $U_1$, $U_2$, $U_3$. The terminals can be, for example, a smartphone, a tablet, a mobile telephone or a dedicated piece of communication equipment. The service can be for example accessible via an application or a piece of software.

The embodiment is described hereinafter with 3 "subscribing users" to the service of an individual $U_0$. They are called indifferently a subscriber or a user. The invention also applies with a plurality of users subscribed to the service of an individual with no limit as to the number. It is possible to configure the number of subscribing users using an interface, for example, of the first equipment $EQ_0$ or of a terminal $T_i$ or of a computer connected to a network with the required access rights where applicable.

When the first individual emits an SOS message, it is automatically emitted to a plurality of terminals of which the call identifiers are known either by the first equipment $EQ_0$ or by a server $SERV_0$. By way of example, the call identifiers can be prerecorded in a memory of the first equipment $EQ_0$. During a configuration phase, the numbers can be for example recorded in a directory of the first equipment $EQ_0$.

According to another embodiment, the equipment $EQ_0$ emits an SOS message to a server $SERV_0$ which can access a directory that is preconfigured so as to automatically re-emit as many SOS messages as there are users $U_i$ configured beforehand. An advantage of this embodiment, is to make the directory of the server $SERV_0$ accessible to at least one user $U_1$, $U_2$ or $U_3$ in such a way that they can modify it, add or delete a person. An interest is to make it possible to configure the service for a close relation, for example, elderly.

Each terminal $T_1$, $T_2$, $T_3$ addressed by the SOS message, if it is accessible from a communication network, receives the SOS message. This step is noted as RECEPT_SOS in each terminal $T_1$, $T_2$ and $T_3$. Each terminal $T_1$, $T_2$, $T_3$ then generates an indicator so as to warn its user $U_1$, $U_2$, $U_3$ of the arrival of an emergency message. This can be an audible, visual or mechanical indicator such as a vibration or a combination of indicators. In the is embodiment of FIG. 1, among the users $U_1$, $U_2$, $U_3$, a user $U_3$ accepts to respond to the SOS message by validating an acceptance command noted as $C_{ACC}$.

In the example of FIG. 1, the user $U_3$ is the first to validate the reception of the SOS emergency message indicating that they are taking the call. A first two-way communication COM_1 between the terminal $T_3$ and the first equipment $EQ_0$ then starts.

Taking the Geographical Position into Account

According to an embodiment, the geographical position of the first individual $U_0$ is emitted in the SOS message.

According to an embodiment, the GPS positions of the community are shared and the notifications are emitted preferably according to a time sequence that depends on GPS positions of each user. A first emergency SOS message is emitted to the user who is geographically the closest to the first individual $U_0$ and so on until the last SOS message emitted to the user located the farthest from the individual.

Calculating distances can be carried out between the position recovered from the first individual $U_0$ and the position of each user $U_i$.

According to an embodiment, the GPS positions are not necessarily shared and in this case a default address is chosen, for example the address of the work place or of the domicile of a user. The latter can be recorded and/or shared beforehand. According to another embodiment, only the address defined by the user $U_i$ is chosen. This option can be recommended potentially when a user does not wish to share their current position.

According to an embodiment, the emergency messages are sent in cascade following an predefined time interval between each emission. According to another embodiment, the second emergency message $M_0'$ is emitted when the first emergency message $M_0$ did not succeed in establishing a communication COM_1.

According to an embodiment, if the geographical position of a user $U_i$ is in a zone defined as out of scope, the emergency message $M_0$ is not emitted to the user in question. In another case, it is received, but it is not processed, i.e. the terminal does not emit an indicator to the user to inform them of the emission of an SOS message. This makes it possible to not emit an emergency message or to not notify the reception thereof to a user located in a time zone that is too far from the first individual $U_0$, for example when they are on vacation.

Establishing a Communication

According to a first embodiment, when the validation of an acceptance command $C_{ACC}$ to respond to the SOS message is activated, for example here by the terminal $T_3$, a communication is automatically established between the first equipment $EQ_0$ and the terminal $T_3$.

According to a first example, the communication COM_1 is then initialized by the terminal $T_3$. According to an embodiment, the call number of the first equipment $EQ_0$ is inserted into the SOS message in such a way that the analysis of the message makes it possible to extract the call number using a calculator of the terminal $T_3$. According to another example, the call number is recovered in a memory of the terminal $T_3$ or in the remote server $SERV_0$ from information that identifies the first individual $U_0$. In this latter case, a data exchange can take place between the server SERV0 and the terminal $T_3$ prior to the establishing of the communication COM_1.

According to a second example, a response to the SOS message is emitted by the terminal $T_3$ in the form of an acceptance message $C_{ACC}$ of a response to the SOS message. In this case, the communication COM_1 is automatically initiated by the equipment $EQ_0$ to the terminal $T_3$ that accepted the SOS message. If it is the equipment $EQ_0$ that initiates the call, establishing the communication COM_1 can for example be subjected beforehand to acceptance from the individual $U_0$ who validates the pertinence of establishing a communication with such and such user. When a confirmation is expected by the individual $U_0$, according to an embodiment, in terms of a predetermined lapse of time, a communication is in any case undertaken automatically. This case makes it possible to process the case wherein the individual $U_0$ is not in a position to validate the identity of the user who wants to establish a communication COM_1.

According to an embodiment, the communication COM_1 established is an audio communication, such as a telephone communication between the first equipment $EQ_0$ and the terminal $T_3$. This communication makes it possible to have the first individual $U_0$ dialog with the third user $U_3$.

FIG. 1 shows the start D_COM_1 of the establishing of the communication COM_1. The double arrow represents the two cases wherein it is either the terminal $T_3$ that initiates the communication, or the equipment $EQ_0$.

The end of the communication is an notated as F_COM_1. It can be undertaken by one or the other of the users $U_0$ or $U_3$. According to an embodiment, the end of the communication can be engaged automatically. This can for example be the case following an action of the first individual $U_0$ or of the third user $U_3$ such as an acknowledgement of the incident as resolved or a transfer of the call to another user or any other action stemming from the person called or from the caller.

During the communication, the method of the invention makes it possible to automatically generate notifications with other users. These notifications during the communication COM_1 are noted as GEN_NOTIF_1. According to the embodiment, or even the nature of the notifications, they can come from the first equipment $EQ_0$ or from the terminal $T_3$. In FIG. 1, a notification $M_1$ is emitted from the first equipment $EQ_0$ to the terminals $T_1$ and $T_2$, i.e. the other terminals that have not established communication, but of which the users are able to be interested by the change in the taking of the call by the user $U_3$. The block GEN_NOTIF_1 is also indicated as a dotted line on the side of the terminal $T_3$ in FIG. 1 so as to illustrate the possibility that the notifications can come from this terminal $T_3$.

The notifications $\{M_i\}$ can be emitted by the equipment $EQ_0$ or the terminal $T_3$, but also directly from a remote server, for example the server $SERV_0$ that made it possible to establish the emitting of the emergency SOS message and/or the communication COM_1.

According to an embodiment, certain notifications are directly emitted automatically to the terminals $T_1$ and $T_2$, others are emitted following an action of the user $U_3$ or of the first individual $U_1$.

In the example of FIG. 1, the first notification $M_1$ comprises information that indicates the identity of the user $U_3$ to the other users $U_1$, $U_2$ who have not responded to the emergency message $M_0$ or who responded after the user $U_3$. In an embodiment, the call number of the user $U_3$ is also entered in the notification $M_1$.

In an embodiment, not shown, other notifications are emitted to the users $U_1$, $U_2$, in particular a notification providing information on the status of the communication COM_1 among a list of statuses: {taking the call; in progress; end of communication, etc.}. According to another embodiment, the geographical position of the first individual $U_0$ can be indicated in a notification or the geographical position of the third user $U_3$.

An interest is to keep the community of subscribers informed so that the latter can obtain a minimum of information as to the following of the taking of the call by the third user $U_3$.

According to another embodiment, the users $U_1$, $U_2$ of the community can receive notifications emitted by an action of the first individual $U_0$ or of the third user $U_3$. The notifications can be text messages or images, they can also be prerecorded notifications and proposed to one or the other of the first individual $U_0$ or of the third user $U_3$. By way of example, a prerecorded notification can be "CALL A DOCTOR REQUIRED" or "MOVEMENT OFF A USER REQUIRED" or "CARDIAC EVENT", etc.

Thus, a list of notifications can be presented during the communication COM_1 by means of an interactive interface proposed in the service. For example, the user $U_3$ can, while speaking to the first individual $U_0$, generate notifications according to the case encountered.

Notification of the End of the Call $M_2$

The method of the invention comprises a step at the end of the communication COM_1 of emitting a call end notification $M_2$ making it possible to transmit a resolution status of the alarm to the other users $U_1$, $U_2$. This can be a status of the "INCIDENT CLOSED" type with a description field that makes it possible to indicate how the incident was closed.

The call end notification $M_2$ can also comprise the duration of the communication COM_1.

According to an embodiment, the third user $U_3$ can indicate to the other users that the incident is not closed. In this case, a person from the community can decide to undertake the establishing of a communication with the first individual U0. If this is not the case, the method of the invention makes it possible to generate another sending of the SOS message to the community in the event of failure of a first attempt of resolution by the establishing of a communication COM_1.

In a complementary embodiment, the user $U_3$ furthermore has the possibility of selecting a status proposed by their interface or to define it themselves according to the embodiment.

According to an embodiment, the first individual U0 can also generate a notification $M_3$ with the community indicating that the problem is resolved or that it has changed or that it remains unresolved. This step is noted as GEN_NOTIF_3 in FIG. 1.

When the status is not closed and the communication COM_1 is terminated, a second SOS message can automatically be re-emitted intended for other recipients $U_1$ and $U_2$ so that another user can respond to the emergency call emitted by the first individual.

According to another embodiment, the third user $U_3$ can indicate the identity of a user $U_2$ who is to be contacted with priority during the call COM_1 or at the time of terminating the call COM_1 of which either in a notification of the $M_1$ type (emitted during the call COM_1) or of the $M_2$ type (emitted after the call COM_1)

According to another embodiment, the third user $U_3$ can generate a notification aiming to establish another communication between them and the first individual. This case can occur when the first communication COM_1 was interrupted, for example, following a problem linked to a deficiency in the network coverage or to a battery problem or to any other type of problem that has for consequence suspending the communication COM_1. The third user $U_3$ can therefore solicit with priority a call to the first equipment $EQ_0$ before another SOS alarm is re-emitted by the latter.

According to an embodiment, the user $U_3$ can directly activate a call to an emergency center such as the ambulance, a police or fire service or another other public or private service that makes it possible to ensure an emergency assistance service. Such a service can be ensured using a centralized call server $SERV_1$. It is also possible to activate a command that makes it possible to put such a service in contact with the first individual $U_0$.

Figure 2:
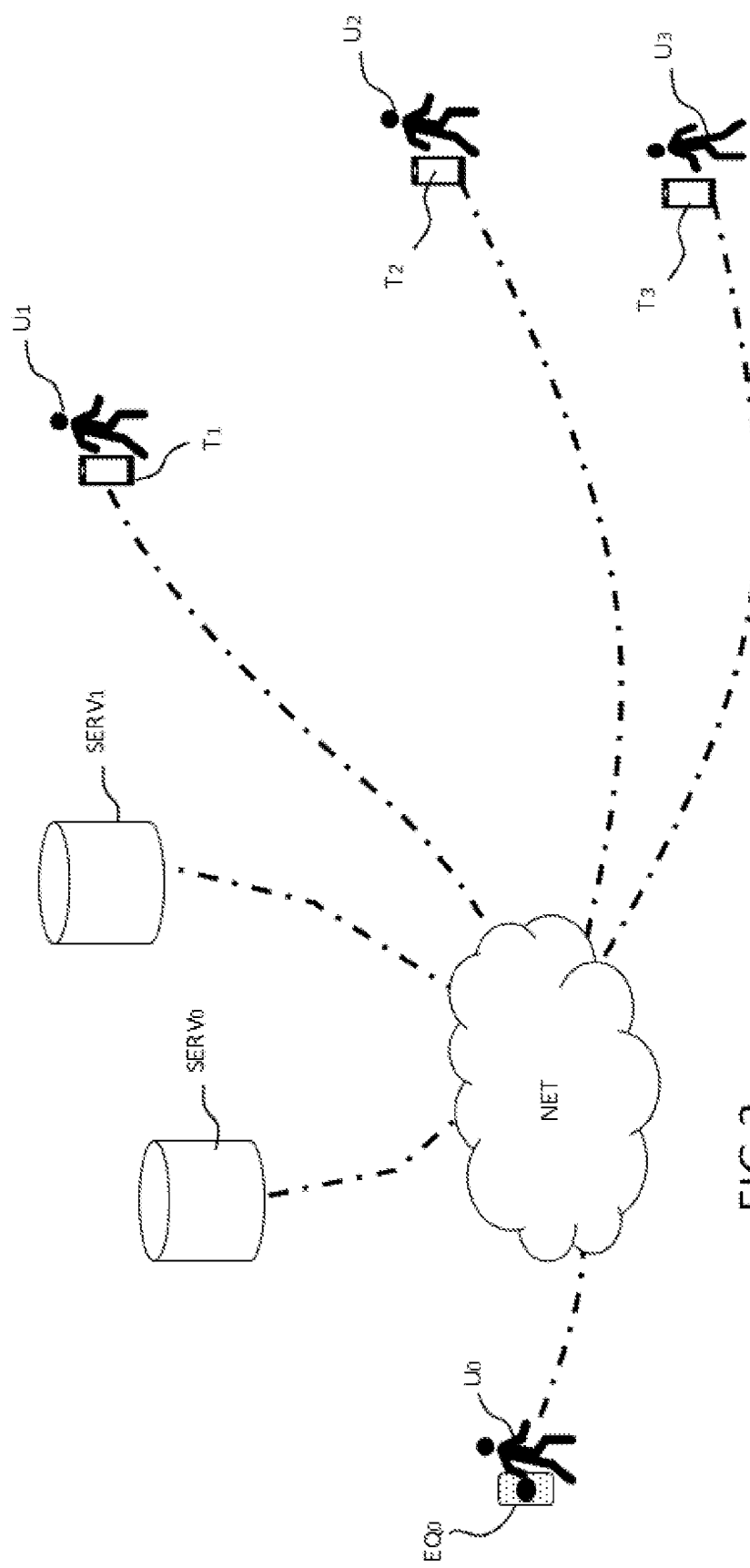
FIG. 2: a case showing an individual including a piece of equipment according to the invention who has emitted an SOS message with a community of users.

FIG. 2 shows an individual $U_0$ comprising equipment of the invention $EQ_0$ and having emitted an SOS emergency message with a community of users $U_1$, $U_2$, $U_3$.

A server $SERV_0$ is shown in FIG. 2. The server $SERV_0$ comprises data relative to each user $U_1$, $U_2$, $U_3$ such as the call numbers and the identifiers of each user. The server $SERV_0$ is used, in this case, to receive the SOS message of the first individual $U_0$ and to re-emit to the community of subscribers of the first individual $U_0$. In the latter, the server $SERV_0$ can be the server that centralizes the exchanges within the community of users with the first individual $U_0$ and the assisting user $U_3$. According to an alternative, the data is hosted in a cloud, i.e. over a plurality of remote data servers.

A server $SERV_1$ is shown, it corresponds in this case to a server of a call center, for example an emergency call center. When a user cannot resolve the problem, a transfer of the call to a remote assistance call center is undertaken.

The invention therefore makes it possible to improve the coordination of the assistance provided to a person who has solicited a community of users who have subscribed to an assistance service with the latter. An advantage is to keep the entire community informed of the change in the assistance when a user has contacted the person in distress. An advantage is to favor the rapidity of distributing information within the community so as to coordinate for example actions in parallel. Another advantage is to decrease the number of exchanges between the users via an instant distribution system that makes it possible to share a summary of the assistance provided.

An advantage of the present invention is therefore to make it possible to process different types of notifications. This allows for processing that is better adapted to each alert emission case.

A first type of notification can be generated automatically from one of the terminals, $EQ_0$ or $T_3$, by using the information linked to the communication established between the two terminals. Thus, the notifications can be triggered automatically from events linked to the communication session. For example, the establishing of the communication, the interruption of the communication, the establishing of a conference mode can be events that contribute to automatically generating notifications emitted by one of the two terminals to the set or the subset of the terminals of the other users who have not established communication with the user $U_0$. These notifications correspond to notifications generated from events linked to the communication, they can be, for example, called "communication notifications".

A second type of notification can be generated automatically from one of the terminals by using the information linked to digital data generated from one of the terminals, preferably terminal $T_3$ of the assisting user $U_3$. Indeed, the latter is in a better position to generate notifications to the other users to activate an assistance scenario or reassure the other users of the processing of the alert.

Consider the case where the assisting user $U_3$ emits the notifications, a similar case could be described by considering that the notifications are emitted from the terminal of the emitter $U_0$. Thus, the notifications can be triggered following the action of the assisting user $U_3$ during the communication. Alternatively or jointly, they can be generated automatically according to the occurrence of certain events from the terminal $T_3$.

In this case, it is the status of the processing of the alert as such that is the source of the notifications emitted, not the status of the communication. These notifications correspond to notifications generated from events linked to the data exchanged, they can be for example called: "alert processing notifications". These notifications are emitted to the other users of the community. They can be, for example, generated from a digital icon that can be accessed from the interface of a terminal. Certain notifications can, indeed, be prerecorded and be triggered following the action of the user $U_3$.

For example, the method of the invention allows for the generating of a processing indicator that qualifies the importance of the alert, an indicator suggesting the calling of a doctor, an indicator suggesting rapid intervention on the site of presence of the user $U_0$, a resolution indicator or an indicator suggesting the establishing of a communication between the user $U_0$ and another assisting user of the community, $U_1$, $U_2$, in the example case described hereinabove. Other notifications can be carried, out.

Thus, it is understood that the method of the invention makes it possible to propose a solution that favors, in a first step, the establishing of a communication between the first responder to an SOS and the emitter thereof. It makes it possible in a second step to define the qualification of the status of the alert and of the following thereof within the community of users. The invention therefore overcomes a solution in which levels of priority have to be defined beforehand within a community and it overcomes a solution in which third-party equipment organizes the communications between the emitter of the SOS and an assisting user. Indeed, these predefined levels of priority cannot be adapted to a particular processing of the alert with a lack of being able to have information linked to the processing status of the alert, of its level of importance, its qualification or an action that has to be carried out quickly within the community.

The invention claimed is:

1. A method for managing the assistance to a person in response to the emission of an alert comprising:
    emitting an save our souls (SOS) alert from a first mobile equipment of a first user by a wireless interface to a first set of terminals of a plurality of users each one having a call identifier, the call identifiers being recorded in a memory of the first mobile electronic equipment or of a remote equipment;
    establishing of a two-way communication between the first equipment and a given terminal of the first set of an assisting user;
    automatic generating of a plurality of first notifications to a subset of terminals of the first set, each one of the first notifications comprising at least one piece of data identifying the assisting user;
    automatic generating of a plurality of second notifications to terminals of the second subset by an action of the assisting user or the first user, each second notification comprising a status relative to the processing of the alert by the assisting user, at least one second notification being prerecorded and proposed to one or the other of the first individual or of the assisting user.

2. The method according to claim 1, wherein the emission of the SOS alert is generated following at least one of the events of the following list:
    a pressing at least for a predefined duration on a control interface of the first equipment;
    a detecting of an acceleration exceeding a predefined threshold, said acceleration being acquired from an accelerometer arranged within said first equipment;
    a detecting of an acceleration sequence having a minimum of similarity with an acceleration profile over a predefined period, said acceleration sequence being acquired from an accelerometer arranged within the first equipment.

3. The method according to claim 1, wherein the emission of the SOS alert is generated from a low-speed communication protocol of the GSM, GPRS, LTE-M or NB-IOT type.

4. The method according to claim 1, wherein the first two-way communication is established following the validation of an acceptance command on a given terminal of a user of a plurality of users.

5. The method according to claim 1, wherein the first two-way communication is automatically established following:
    either a call request coming from the given terminal of the assisting user;
    or a call request coming from the first equipment following the reception of a notification comprising information that identifies the assisting user who emitted an acceptance command.

6. The method according to claim 1, wherein the first notification is automatically emitted following the establishing of the first two-way communication from:
- the first equipment, or;
- the given terminal that validated the acceptance command or;
- a data server comprising information on the identification of the users of the second set.

7. The method according to claim 1, wherein:
- the SOS alert comprises information that identifies the first user and a geographical position of the first equipment and/or;
- the first notification comprises a geographical position of the assisting user and/or;
- the second notification comprises a call duration and a resolution indicator.

8. The method according to claim 1, wherein when no acceptance command has been established within a predefined period of time:
- a new SOS message is emitted within the first set;
- a message is emitted to a predefined call center.

9. The method according to claim 1, wherein the assisting user can, from a predefined command, transmit an instruction that results in the establishing of a second two-way communication between the first user and a second given user.

10. A computer comprises a calculator and a non transitory memory for the implementation of the steps of the method of claim 1.

11. A non-transitory computer readable medium comprising instructions for the implementation of the steps of the method of claim 1.

12. A mobile electronic equipment comprising a control interface comprising an actuator through which the generating of a command results in the emission of an save our souls (SOS) message intended for a first set of users using a wireless communication interface, said equipment comprising means for:
- establishing a first two-way communication with a given terminal of the first set of an assisting user;
- automatically generating a plurality of first notifications to a subset of terminals of the first set, each one of the first notifications comprising at least one piece of data identifying the assisting user;
- automatically generating a plurality of second notifications to terminals of the second subset by an action of the assisting user or the first user, each second notification comprising a status relative to the processing of an SOS alert by the assisting user, the second notifications being prerecorded and proposed to one or the other of the first individual or of the assisting user.

13. The method according to claim 1, wherein a list of prerecorded notifications are presented during the communication by means of an interactive interface.

* * * * *